(12) United States Patent
McDaniel et al.

(10) Patent No.: US 6,388,017 B1
(45) Date of Patent: May 14, 2002

(54) PROCESS FOR PRODUCING A POLYMER COMPOSITION

(75) Inventors: Max P. McDaniel, Bartlesville; Anthony P. Eaton, Dewey; Elizabeth A. Benham, Bartlesville, all of OK (US); Shawn R. Kennedy, Soldotna, AK (US); Ashish M. Sukhadia, Bartlesville, OK (US); Rajendra K. Krishnaswamy, Bartlesville, OK (US); Kathy S. Collins, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/577,952

(22) Filed: May 24, 2000

(51) Int. Cl.$^7$ ................................................. C08L 23/00
(52) U.S. Cl. ...................... 525/240; 526/113; 526/114; 526/118; 526/119; 526/201; 526/124.3; 526/160; 526/943
(58) Field of Search ........................... 525/240; 526/113, 526/114, 118, 119, 201

(56) References Cited

U.S. PATENT DOCUMENTS

| | | | |
|---|---|---|---|
| 4,399,056 A | * | 8/1983 | Shipley .................. 252/431 C |
| 4,539,374 A | * | 9/1985 | Fenton et al. ................ 525/240 |
| 5,019,627 A | * | 5/1991 | Honma et al. ............... 525/240 |
| 5,237,025 A | * | 8/1993 | Benham et al. .............. 526/114 |
| 5,332,707 A | | 7/1994 | Karayannis et al. ......... 502/113 |
| 5,380,803 A | * | 1/1995 | Coutant et al. .............. 525/240 |
| 5,401,820 A | * | 3/1995 | McDaniel et al. ........ 526/348.5 |
| 5,767,032 A | | 6/1998 | Hokkanen et al. .......... 502/108 |

* cited by examiner

Primary Examiner—David W. Wu
Assistant Examiner—R. Rabago
(74) Attorney, Agent, or Firm—Polly C. Owen

(57) ABSTRACT

A process is provided for producing a polymer composition. The process comprises contacting a narrow molecular weight distribution base polymer and a high molecular weight polymer component. The base polymer is an ethylene polymer having a Mw/Mn less than about 5 and a melt flow index from about 0.2 g/10 min to about 20 g/10 min. The high molecular weight polymer component has a molecular weight distribution such that at least a substantial portion of its molecules have a molecular weight of greater than one million. The high molecular weight polymer component being incorporated is in an amount to give about 0.1% to about 10% by weight, based on the total weight of the polymer composition, of the molecules having a molecular weight greater than one million. The polymer composition has a higher bulk density than the base polymer. In addition, when the polymer composition is blown into film, the film has improved clarity over the base polymer.

73 Claims, No Drawings

PROCESS FOR PRODUCING A POLYMER COMPOSITION

FIELD OF INVENTION

This invention is related to the field of processes for producing a polymer composition.

BACKGROUND OF THE INVENTION

The production of polymers is a multi-billion dollar business. This business produces billions of pounds of polymers each year. Millions of dollars have been spent on developing technologies that can add value to this business.

Increasing production of polymers from polymerization processes is an important area of polymer research. In addition, discovering new polymer blends having superior properties also is a continuing research goal. Specifically, improving optical properties, such as haze and gloss, of such polymers blends blown into film, also is an important goal of polymer research since film is often used in packaging and other applications.

It is an object of this invention to provide a process for producing a polymer composition.

It is another object of this invention to provide the polymer composition.

It is another object of this invention to provide a process for increasing the production of polymers from polymerization processes by increasing the bulk density of a narrow molecular weight distribution base polymer by incorporating a high molecular weight polymer component with the narrow molecular weight distribution base polymer to produce a polymer composition.

It is another object of this invention to provide a process for increasing the clarity of blown film produced from a narrow molecular weight distribution base polymer by incorporating a high molecular weight polymer component with the narrow molecular weight distribution base polymer to produce a polymer composition.

SUMMARY OF THE INVENTION

In accordance with one embodiment of this invention, a process for producing a polymer composition is provided. The process comprises incorporating a narrow molecular weight distribution base polymer and a high molecular weight polymer component to produce the polymer composition;
  wherein the base polymer is an ethylene polymer having a Mw/Mn less than about 5 and a melt flow index from about 0.2 g/10 min to about 20 g/10 min; and
  wherein the high molecular weight polymer component has a molecular weight distribution such that at least a substantial portion of its molecules have a molecular weight of greater than one million, the component being incorporated is in an amount to give about 0.1 to about 10% by weight, based on the total weight of said polymer composition, of the molecules having a molecular weight greater than one million.

These objects, and other objects, will become more apparent to those with ordinary skill in the art after reading this disclosure.

DETAILED DESCRIPTION OF THE INVENTION

A process is provided for producing a polymer composition. The process comprises incorporating a narrow molecular weight distribution base polymer and a high molecular weight polymer component. The narrow molecular weight distribution base polymer is hereinafter referred to as a "base polymer". When the base polymer is incorporated with the high molecular weight polymer component, the bulk density of the base polymer is increased, thereby, increasing the production rate. The bulk density of the polymer composition can be increased by about 10% to about 40% over the bulk density of the base polymer. In order to achieve the bulk density increase, the high molecular weight polymer component must be incorporated with the base polymer while the base polymer is produced in a polymerization zone.

Another benefit of incorporating the base polymer and the high molecular weight polymer component is to increase the clarity of blown film produced from the base polymer. In order to achieve this clarity increase, the incorporation of the high molecular weight polymer component can be accomplished either while the base polymer is being produced in the polymerization zone or after the base polymer and high molecular weight polymer component have been produced separately. For example, the base polymer and high molecular weight polymer component can be blended together to produce the polymer composition. The haze of the polymer composition can be decreased by about 5% to as much as about 60% over the haze of the base polymer, and the gloss of the polymer composition can be increased by about 10 to about 40% over the gloss of the base polymer.

The base polymer is defined as the narrow molecular weight polymer before the high molecular weight polymer component is added to produce the polymer composition. The base polymer can be any narrow molecular weight distribution ethylene polymer, either a homopolymer or copolymer, such as, for example, ethylene-hexene copolymers. The base polymer has a Mw(weight average molecular weight)/Mn (number average molecular weight) of less than about 5.0. Preferably, Mw/Mn of the base polymer is less than about 4.0, and most preferably, Mw/Mn of the base polymer is less than 3.0.

Base polymers can be produced from any catalyst known in the art to produce narrow molecular weight distribution polymers. For example, metallocene catalysts of various types, such as described in U.S. Pat. Nos. 5,436,305; 5,610,247; and 5,627,247, herein incorporated by reference, can be used to produce the base polymer. Ziegler catalysts containing magnesium and titanium halides, such as described in U.S. Pat. Nos. 5,275,992; 5,179,178; 5,275,992; 5,237,025; 5,244,990; and 5,179,178, herein incorporated by reference, can also be used. Chromium catalysts as described for example in U.S. Pat. Nos. 3,887,494; 3,119,569; 3,900,457; 4,981,831; 4,364,842; and 4,444,965, herein incorporated by reference, also can be utilized to produce the base polymer. Preferably, the base polymer is produced from metallocene catalyst. Since these catalysts are well known to produce a narrow molecular weight distribution polymer, are very active, and often are very efficient for the incorporation of comonomer.

The base polymer can be an ethylene homopolymer or preferably, a copolymer of ethylene and at least one other alpha-olefin, such as 1-hexene, 1-butene, or 1-octene. Most preferably, the base polymer is an ethylene-hexene copolymer.

Generally, the density of the base polymer is in a range of about 0.900 g/cc to about 0.975 g/cc. Preferably, the density of the base polymer is in a range of about 0.910 g/cc to about 0.940 g/cc, and most preferably, from 0.915 g/cc to 0.93 g/cc. Generally, the base polymer has a melt flow index in a range from about 0.2 g/10 min to about 20 g/10 min. Preferably, the base polymer has a melt flow index in a range from about 0.5 g/10 min to about 10 g/10 min, and most preferably from 0.8 g/10 min to 5.0 g/10 min.

The high molecular weight polymer component can be produced from most any known catalyst system, whether the high molecular weight polymer component is produced simultaneously with the base polymer in the polymerization zone, or separately and blended later. Suitable catalysts for production of the high molecular weight polymer component include, but are not limited to, Ziegler catalysts based on titanium halides, zirconium halides, zirconium alkyls, chromium oxide catalysts, metallocene catalysts, and mixtures thereof.

The high molecular weight polymer component has a molecular weight distribution, such that, a substantial portion of its molecules have a molecular weight greater than one million. Generally, the high molecular weight polymer component being incorporated is in an amount to give about 0.1% to about 10% by weight, based on the total weight of the polymer composition, of the molecules having a molecular weight greater than one million. Preferably, the high molecular weight polymer component being incorporated is in an amount to give about 0.5% to about 5% by weight, based on the total weight of the polymer composition, of the molecules having a molecular weight greater than one million, most preferably, 1% to 3% by weight.

It is not imperative that the additional high molecular weight polymer component be pure. For example, a high molecular weight polymer component which also contains a substantial amount of polymer of molecular weight lower than one million can be incorporated into the base polymer provided it has a sufficient amount of polymer above one million in molecular weight to contribute the proper amount of high molecular weight polymer component described previously.

To achieve the increase in bulk density of the polymer composition, the high molecular weight polymer component must be incorporated with the base polymer in the polymerization zone. Any method known in the art to incorporate the high molecular weight polymer component with the base polymer in the polymerization zone can be utilized.

One method of incorporating the high molecular weight polymer component is to modify a polymerization catalyst system before it is added to the polymerization zone. For example, a second transition metal component can be added to the polymerization catalyst system which then is capable of generating simultaneously the base polymer and the high molecular weight polymer component.

A second method of incorporating the high molecular weight polymer component is to chemically modify the polymerization catalyst system while it is in the polymerization zone, such as by adding a second component which will react with a catalyst in the polymerization catalyst system to create the high molecular weight polymer component. For example, a metallocene catalyst system can be modified to include a titanium or chromium component, either before the metallocene catalyst system is introduced into the polymerization zone, or while it is in the polymerization zone. A halided, titanium-containing solid oxide compound or fluorided, chromium-containing solid oxide compound can be utilized as the titanium or chromium component.

The halided, titanium-containing solid oxide compound comprises at least one halogen, titanium, and a solid oxide compound. The halogen is at least one selected from the group consisting of chlorine, bromine, and fluorine. Generally, the solid oxide compound is selected from the group consisting of alumina, silica, aluminophosphate, aluminosilicates, aluminoborates, silica-zirconia, silica-titania, and mixtures thereof. Preferably, the solid oxide compound is silica-alumina or alumina. The solid oxide compound can be produced by any method known in the art, such as, for example, by gelling, co-gelling, impregnation of one compound onto another, and flame hydrolysis.

When silica-titania is used, the content of titania can be about 1 to about 15% by weight titanium based on the total weight of the silica-titania, preferably, about 2.5 to about 12% by weight, and most preferably, 4 to 10% by weight, with the remainder being primarily silica. The silica-titania can be produced by any method known in the art. Such processes are disclosed in U.S. Pat. Nos. 3,887,494; 3,119,569; 4,405,501; 4,436,882; 4,436,883; 4,392,990; 4,081,407; 4,152,503; 4,981,831; 2,825,721; 3,225,023; 3,226,205; 3,622,521; and 3,625,864; the entire disclosures of which are hereby incorporated by reference. The silica-titania can be made by cogellation of aqueous materials, or by cogellation in an organic or anhydrous solution, or by coating the surface of silica with a layer of titania such as, for example, by reaction of silanol groups with titanium isopropoxide followed by calcining.

Aluminophosphate can be made by any method known in the art, such as, for example, those methods disclosed in U.S. Pat. Nos. 4,364,842, 4,444,965; 4,364,855; 4,504,638; 4,364,854; 4,444,964; 4,444,962; 4,444,966; and 4,397,765; the entire disclosures of which are hereby incorporated by reference.

Silica-alumina can be made by any method known in the art. The amount of alumina in the silica-alumina can range from about 2 to about 50% by weight based on the total weight of the silica-alumina, preferably, from about 5 to about 30% by weight, and most preferably, 8 to 20% by weight. Commercial grade silica-alumina is available as MS13-110 from W. R. Grace and commercial grade alumina as Ketjen Grade B or Ketjen Grade L from Akzo Nobel.

Generally, the specific surface area of the solid oxide compound is from about 100 to about 1000 $m^2/g$, preferably, from about 200 to about 800 $m^2/g$, and most preferably, from 250 to 600 $m^2/g$ after calcining at 500° C.

The specific pore volume of the solid oxide compound is typically greater than about 0.5 $cm^3/g$, preferably, greater than about 0.8 $cm^3/g$, and most preferably, greater than 1.0 $cm^3/g$.

The halided, titanium-containing solid oxide compound can be produced when the solid oxide compound is contacted with at least one titanium-containing compound and at least one halogen-containing compound. The order of contacting the solid oxide compound with the titanium-containing compound and the halogen-containing compound can vary.

To produce the halided, titanium-containing solid oxide compound, at least one titanium-containing compound is contacted with the solid oxide compound by any means known in the art to produce a titanium-containing solid oxide compound. Titanium can be added to the solid oxide compound before, during, or after calcining. Generally, the amount of titanium present in the titanium-containing solid oxide compound is in a range of about 0.01 to about 10 weight percent titanium where the weight percent is based on the weight of the titanium-containing solid oxide compound. Preferably, the amount of titanium present in the titanium-containing solid oxide compound is in a range of about 0.1 to about 5 weight percent titanium based on the weight of the titanium-containing solid oxide compound. Most preferably, the amount of titanium present in the titanium-containing solid oxide compound is in a range of 0.5 to 2 weight percent titanium based on the weight of the titanium-containing solid oxide compound.

In one method of producing a titanium-containing solid oxide compound, the solid oxide compound can be contacted with an aqueous or organic solution of the titanium-containing compound before calcining. For example, the titanium can be added to the solid oxide compound by forming a slurry of the solid oxide compound in a solution of the titanium-containing compound and a suitable solvent such as alcohol or water. Particularly suitable are one to three carbon atom alcohols because of their volatility and low surface tension. Titanium alkoxides, $Ti(OR)_4$, where R is an alkyl or aryl group having 1 to about 12 carbons, is particularly suitable as a titanium source. A suitable amount of the solution is utilized to provide the desired concentration of titanium after drying. Drying can be effected by any method known in the art. For example, said drying can be completed by suction filtration followed by evaporation, vacuum drying, spray drying, or flash drying. This method is exemplified by U.S. Pat. Nos. 4,294,724; 4,382,022; 4,402,864; 4,405,768; and 4,424,320; the entire disclosures of which are herein incorporated by reference.

In a second method, the titanium can be cogelled into the solid oxide compound when the solid oxide compound is being produced as exemplified by U.S. Pat. Nos. 3,887,494; 3,119,569; 4,405,501, and 4,436,882, the entire disclosures of which are herein incorporated by reference.

If the titanium is added before calcination, any water soluble or organic soluble titanium-containing compound is suitable that can impregnate the solid oxide compound with titanium. In a coprecipitation method, a titanium compound such as titanium halides, titanium nitrates, titanium sulfates, titanium oxalates, or alkyl titanates, for example, is incorporated with an acid or a silicate. Titanyl sulfate ($TiOSO_4$) dissolved in sulfuric acid is a particularly suitable compound. If the titanium is deposited onto the surface of an already formed solid oxide compound, titanium halides, $TiX_4$ where X is chloride or bromide, or alkyl titanates, $Ti(OR)_4$ where R is an alkyl or aryl group containing 1 to about 12 carbons are preferred.

If the titanium is added during calcining, one convenient method is to vaporize a volatile titanium-containing compound, such as titanium tetrachloride or titanium tetrafluoride, or an alkyl titanate ($Ti(OR)_4$ where R is an alkyl or aryl group containing 1 to about 12 carbons, into a gas stream used to contact the solid oxide compound.

If the titanium is added after calcining, a preferred method is to impregnate the solid oxide compound with a hydrocarbon solution of the titanium-containing compound, preferably a titanium halide or titanium alkoxyhalide, such as $TiCl_4$, $TiORCl_3$, $Ti(OR)_2Cl_2$, and the like, where R is an alkyl or aryl group having 1 to about 12 carbons.

Calcining is conducted at various steps in the production of the halided, titanium-containing solid oxide compound. Generally, calcining is conducted for about 1 minute to about 100 hours, preferably from about 1 hour to about 50 hours, and most preferably, from 3 to 20 hours. Generally, the calcining is conducted at a temperature in a range of about 200° C. to about 900° C., preferably from about 300° C. to about 700° C., and most preferably, from 350° C. to 600° C. The calcining can be conducted in any suitable atmosphere. Generally, the calcining can be completed in an inert atmosphere. Alternatively, the calcining can be completed in an oxidizing atmosphere, such as, oxygen or air, or a reducing atmosphere, such as, hydrogen or carbon monoxide.

To produce the halided, titanium-containing solid oxide compound, the solid oxide compound is also contacted with at least one halogen-containing compound. The halogen-containing compound is at least one selected from the group consisting of chlorine-containing compounds, bromine-containing compounds, and fluorine-containing compounds. The halogen-containing compound can be in a liquid phase, or preferably, a vapor phase. Optionally, the solid oxide compound can be calcined at about 100° C. to about 900° C. before being contacted with the halogen-containing compound.

Any method of fluoriding the solid oxide compound known in the art can be used in this invention. A common method is to impregnate the solid oxide compound with an aqueous solution of a fluoride-containing salt before calcining, such as ammonium fluoride [$NH_4F$], ammonium bifluoride [$NH_4HF_2$], hydrofluoric acid [HF], ammonium silicofluoride [$(NH_4)_2SiF_6$], ammonium fluoroborate [$NH_4BF_4$], ammonium fluorophosphate [$NH_4PF_6$], and mixtures thereof.

In a second method, the fluorine-containing compound can be dissolved into an organic compound, such as an alcohol, and added to the solid oxide compound before calcining to minimize shrinkage of pores during drying. Drying can be accomplished by any method known in the art, such as, for example, vacuum drying, spray drying, flashing drying, and the like.

In a third method, the fluorine-containing compound can be incorporated into the gel formed when producing a solid oxide compound by adding it to at least one of the solutions before gellation. Alternatively, the fluorine-containing compound can be added to the gel before drying. Gellation methods to produce a solid oxide compound were discussed previously in this disclosure.

In a fourth method, the fluorine-containing compound can be added during calcining. In this technique, the fluorine-containing compound is vaporized into the gas stream used to fluidize the solid oxide compound so that it is fluorided from the gas phase. In addition to some of the fluorine-containing compounds described previously, volatile organic fluorides can be used at temperatures above their decomposition points, or at temperatures high enough to cause reaction. For example, perfluorohexane, perfluorobenzene, trifluoroacetic acid, trifluoroacetic anhydride, hexafluoroacetylacetonate, and mixtures thereof can be vaporized and contacted with the solid oxide compound at about 300° C. to about 600° C. in air nitrogen. Inorganic fluorine-containing compounds can also be used, such as hydrogen fluoride or even elemental fluorine.

The amount of fluorine present on the halided, titanium-containing solid oxide compound is about 2 to about 50 weight percent fluorine based on the weight of the halided, titanium-containing solid oxide compound before calcining or the amount added to a precalcined solid oxide compound. Preferably, it is about 3 to about 25 weight percent, and most preferably, it is 4 to 20 weight percent fluorine based on the weight of the halided, titanium-containing solid oxide compound before calcining or the amount added to a precalcined solid oxide compound.

Any method of contacting the solid oxide compound with the chlorine-containing compound or the bromine-containing compound known in the art can be used in this invention. Generally, the contacting is conducted during or after calcining, preferably during calcining. Any suitable chlorine-containing compound or bromine-containing compound that can deposit chlorine or bromine or both on the solid oxide compound can be used. Suitable chlorine-containing compounds and bromine-containing compound include volatile or liquid organic chloride or bromide compounds and inorganic chloride or bromide compounds. Organic chloride or bromide compounds can be selected from the group consisting of carbon tetrachloride, chloroform, dichloroethane, hexachlorobenzene, trichloroacetic acid, bromoform, dibromomethane, perbromopropane, phosgene, and mixtures thereof. Inorganic chloride or bromide compounds can be selected from the group consisting of gaseous hydrogen chloride, silicon tetrachloride, tin tetrachloride, titanium tetrachloride, aluminum trichloride, boron trichloride, thionyl chloride, sulfuryl chloride, hydrogen bromide, boron tribromide, silicon tetrabromide, and mixtures thereof. Additionally, chlorine and bromine gas can be used. Optionally, a fluorine-containing compound can also be included when contacting the zirconium-containing solid oxide compound with the chlorine-containing compound or bromine-containing compound to achieve higher activity in some cases.

If an inorganic chlorine-containing compound or bromine-containing compound is used, such as titanium tetrachloride, aluminum trichloride, or boron trichloride, it can also be possible to achieve the chloriding or bromiding after calcining, either by vapor phase deposition or even by using an anhydrous solvent.

The amount of chlorine or bromine used can be from about 0.01 to about 10 times the weight of the halided, titanium-containing solid oxide compound before calcining or the amount added to a precalcined solid oxide compound, preferably it is from about 0.05 to about 5 times, most preferably from 0.05 to 1 times the weight of the halided, titanium-containing solid oxide compound before calcining or the amount added to a precalcined solid oxide compound.

Generally, the solid oxide compound is contacted with the chlorine-containing compound or bromine-containing compound at a temperature in the range of about 25° C. to about 1000° C., preferably from about 200° C. to 700° C., and most preferably from 300° C. to 600° C.

In another embodiment of this invention, an additional compound can be added to the halided, titanium-containing solid oxide compound to enhance the activity of the organometal compound. For example, an additional metal, such as zinc, silver, copper, antimony, gallium, tin, nickel, tungsten, and mixtures thereof, can be added by contacting the halided, titanium-containing solid oxide compound with a metal-containing compound. This is especially useful if the solid oxide compound is to be chlorided during calcining. When used, these metals are added in an amount of about 0.01 to about 10 millimoles per gram of halided, titanium-containing solid oxide compound, preferably about 0.1 to about 5 millimoles per gram, and most preferably from 0.5 to 3 millimoles of metal per gram of halided, titanium-containing solid oxide compound.

Preferably, magnesium is added to the halided, titanium-containing solid oxide compound to increase the activity of the titanium component of the catalyst composition by contacting the halided, titanium-containing solid oxide compound with a magnesium-containing compound. The amount of magnesium used can be from about 0.01 to about 10 millimoles per gram of halided, titanium-containing solid oxide compound, preferably from about 0.1 to about 5 millimoles per gram, most preferably from 0.1 to 1 millimoles per gram of halided, titanium-containing solid oxide compound. If magnesium is added, it can be added before or after calcining. One preferred method of adding magnesium is to contact an organomagnesium compound in a hydrocarbon solution with the halided, titanium-containing solid oxide compound. Examples of such compounds include, but are not limited to, dialkyl magnesium, alkyl magnesium halide, magnesium alkoxide or aryloxides, and the like.

The fluorided, chromium-containing solid oxide compound comprises fluorine, chromium, and a solid oxide compound. The solid oxide compounds discussed previously can be utilized to produce the fluorided, chromium-containing solid oxide compound. The fluorine can be added to the solid oxide compound as discussed previously for the halided, titanium-containing solid oxide compound. The chromium can be added to the solid oxide compound as discussed previously for titanium. Examples of chromium-containing compounds include, but are not limited to, chromium trioxide ($CrO_3$), ammonium chromate (($NH_4)_2CrO_4$), ammonium dichromate (($NH_4)_2Cr_2O_7$), chromic acetate (Cr($C_2H_3O_2$)$_3$), chromic nitrate ($Cr(NO_3)_3$), chromous chloride ($CrCl_2$), bis-benzene chromium(0) (($C_6H_6)_2Cr$), chromocene (($C_5H_5)_2Cr$), and mixtures thereof. The amount of chromium present is in the range of about 0.01 to about 10% by weight, preferably, about 0.5 to about 5% by weight, and most preferably, from 0.8% to 3% by weight, where the weight percents are based on the weight of the chromium-containing solid oxide compound before calcining.

A third method to incorporate the high molecular weight polymer component is to produce a metallocene catalyst system comprising two metallocene components with a first metallocene component producing the base polymer and a second metallocene component producing the high molecular weight polymer component. Again, this can be accomplished before introduction into the polymerization zone or while in the polymerization zone.

To achieve improvements in the clarity of blown films made from the base polymer, the high molecular weight polymer component can be incorporated as described previously through catalyst system modification, or it can also be incorporated after production in the polymerization zone, such as, by melt blending the base polymer and the high molecular weight polymer component together. Preferably, the clarity improvement is obtained through catalyst modification since no blending is required.

Polymerization can be carried out in any manner known in the art, such as, for example, gas phase, solution or slurry conditions, to effect polymerization. Any polymerization zone known in the art to produce ethylene polymers can be utilized. For example, a stirred reactor can be utilized for a batch process, or the reaction can be carried out continuously in a loop reactor or in a continuous stirred reactor. Processes that can polymerize monomers into polymers using the catalyst systems of this invention are known in the art, such as, for example, slurry polymerization, gas phase polymerization, solution polymerization, and multi-reactor combinations thereof.

A preferred polymerization technique is that which is referred to as a particle form, or slurry process, wherein the temperature is kept below the temperature at which the polymer swells or goes into solution. A loop reactor is particularly preferred. Such polymerization techniques are well known in the art and are disclosed, for instance, in Norwood, U.S. Pat. No. 3,248,179, the disclosure of which is hereby incorporated by reference. Furthermore, it is even more preferred to use isobutane as a diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The preferred temperature in the particle form process is within a range of about 185° F. to about 230° F. (about 85° C. to about 110° C.), although higher or lower temperatures can be used. Two preferred polymerization methods for the slurry process are those employing a loop reactor of the type disclosed in Norwood and those utilizing a plurality of stirred reactors either in series, parallel or combinations thereof wherein the reaction conditions can be different in the different reactors.

Monomers useful in this invention are unsaturated hydrocarbons having from 2 to about 20 carbon atoms. Currently, it is preferred when the monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof. However, when a homopolymer is desired, it is most preferred to use ethylene, or propylene, as the monomer. Additionally, when a copolymer is desired, it is most preferred to use ethylene and hexene as the monomers. The polymer density can be controlled by varying the comonomer to monomer ratio in the polymerization zone.

The molecular weight of the polymer composition can be controlled by various means known in the art, such as, for example, adjusting the temperature (higher temperature giving lower molecular weight), introducing or varying the amount of hydrogen to alter the molecular weight, and varying the catalyst components in the catalyst system.

EXAMPLES

Polymerization Procedures

Ethylene copolymers were prepared in a continuous particle form process (also known as a slurry process) by contacting a catalyst system with ethylene and 1-hexene monomers. The catalyst system consisted of bis(n-butylcyclopentadienyl)zirconium dichloride, a cocatalyst, and Catalyst A, B, or C, which are described subsequently in this disclosure. The medium and temperature were selected such that the copolymer was produced as solid particles and was recovered in that form. Ethylene that had been dried over activated alumina was used as the monomer. Isobutane that had been degassed by fractionation and dried over alumina was used as the diluent. Ethylene copolymers were prepared in a continuous particle form process (also known as a slurry process) by contacting a first catalyst with ethylene and 1-hexene monomers. The medium and temperature were selected such that the copolymer was produced as solid particles and was recovered in that form. Ethylene that had been dried over activated alumina was used as the monomer. Isobutane that had been degassed by fractionation and dried over alumina was used as the diluent.

A liquid full 15.2 cm diameter pipe loop having a volume of 23 gallons (87 liters) was utilized as a reactor. Liquid isobutane was used as the diluent, and occasionally some hydrogen was added to regulate the molecular weight of the ethylene copolymer. The reactor pressure was about 4 Mpa (about 580 psi). The reactor temperature was 80° C. The reactor was operated to have a residence time of 1.25 hours. Catalyst was added through a 0.35 cc circulating ball-check feeder. At steady state conditions, the isobutane feed rate was about 46 liters per hour, the ethylene feed rate was about 30 lbs/hr, and the 1-hexene feed rate was varied to control the density of the ethylene copolymer. Ethylene concentration in the diluent was 8–12 mole percent. Catalyst concentrations in the reactor ranged from 0.001 to about 1 weight percent based on the weight of the reactor contents. Ethylene copolymer was removed from the reactor at the rate of about 25 lbs per hour and recovered in a flash chamber. A Vulcan dryer was used to dry the ethylene copolymer under nitrogen at about 60–80° C.

A cocatalyst, triethylaluminum (TEA), also was added as indicated in a concentration of about 10 to 100 parts per million by weight based on the weight of the diluent. To prevent static buildup in the reactor, a small amount (<5 ppm of diluent) of a commercial antistatic agent sold as Stadis® 450 usually was added. Bis(n-butylcyclopentadienyl) zirconium dichloride was added to the reactor as a solution in isobutane to yield a reactor concentration of 0.5 to 1.5 parts per million based on the weight of the diluent. The metallocene, TEA cocatalyst, and Catalyst A, B, or C were added into a precontacting vessel where they were allowed to contact each other for about 10 minutes before being introduced into the reactor and contacted with the monomers.

Polymerization runs also were made in a 2.2 liter steel autoclave reactor equipped with a marine stirrer running at 400 revolutions per minute (rpm). The reactor was surrounded by a steel jacket containing boiling methanol with a connection to a steel condenser. The boiling point of the methanol was controlled by varying nitrogen pressure applied to the condenser and jacket, which permitted precise temperature control to within half a degree Celsius, with the help of electronic control instruments.

Unless otherwise stated, first, a small amount (0.01 to 0.10 grams normally) of Catalyst A, B, or C was charged under nitrogen to the dry reactor. Next, 2.0 milliliters of a toluene solution containing 0.5 percent by weight of bis(n-butylcyclopentadienyl) zirconium dichloride were added, followed by 0.6 liter of isobutane liquid. Then, 1.0 milliliter of a 1.0 molar solution of triethylaluminum in heptane (TEA) was added, followed by another 0.6 liter of isobutane liquid. Then, the reactor was heated up to the specified temperature, generally 90° C., and finally ethylene was added to the reactor to equal a fixed pressure, typically 550 psig to produce a reaction mixture.

The reaction mixture was allowed to stir for usually about one hour. As ethylene was consumed, more ethylene flowed in to maintain the pressure. The activity was noted by recording the flow of ethylene into the reactor to maintain the set pressure.

After the allotted time, the ethylene flow was stopped, and the reactor slowly depressurized and opened to recover a granular polymer powder. In all cases, the reactor was clean with no indication of any wall scale, coating or other forms of fouling. The polymer powder was then removed and weighed. Activity was specified as grams of polymer produced per gram of Catalyst A, B, or C charged per hour.

Feedstocks and Diluent

The ethylene utilized was polymerization grade ethylene obtained from Union Carbide Corporation. The ethylene then was purified further through a column of ¼ inch beads of Alcoa A201 alumina that had been activated at 250° C. in nitrogen. The isobutane utilized was polymerization grade obtained from Phillips Petroleum Co., Borger, Tex. It was purified further by distillation, and it then was passed through a column of ¼ inch beads of Alcoa A201 alumina that had been activated at 250° C. in nitrogen. The 1-hexene was polymerization grade obtained from Chevron Chemicals. It was purified further by nitrogen purging and storage over 13× molecular sieve that had been activated at 250° C.

Catalyst Preparation

Catalyst A: A silica-alumina was obtained from W.R. Grace as MS 13-110 containing 13% by weight alumina and 87% by weight silica. The silica-alumina had a pore volume of about 1.2 cc/g and a surface area of about 450 square meters per gram. 800 grams of the silica-alumina were impregnated with 1500 milliliters of an aqueous solution containing 80 grams of ammonium bifluoride to produce a mixture. The mixture then was dried in a vacuum oven overnight at 110° C., pushed through a 35 mesh screen, and activated by calcination in dry air at 450° C. for six hours to produce a fluorided silica-alumina.

Catalyst B: 470.83 grams of the same silica-alumina used for Catalyst A were calcined in air at 300° C. for twelve hours to produce a calcined silica-alumina. Afterward, the calcined silica-alumina was impregnated just beyond the point of incipient wetness with a solution containing 169 grams of titanium ethoxide (or about 6% by weight Ti) in 500 mls of heptane to produce a first mixture. The first mixture was shaken thoroughly to ensure uniform wetness then dried in a vacuum oven at 140° C. with a slight nitrogen purge overnight. Then, a solution of 47 grams of ammonium bifluoride in 500 mls of water was added to the first mixture to produce a second mixture. The second mixture was dried under vacuum at 140° C. overnight to produce a dried second mixture. The dried second mixture contained about 6% by weight titanium and 10% by weight ammonium bifluoride. The dried second mixture then was calcined in dry air for 6 hours at 450° C. to produce a fluorided, titanium-containing silica-alumina.

Catalyst C: 750 grams of silica-alumina described previously were impregnated with 1500 mL of an aqueous solution containing 38 grams of ammonium bifluoride and 30 grams of chromium trioxide to equal 2% by weight chromium on the silica-alumina to produce a mixture. After being dried in a vacuum oven overnight at 110° C., the mixture was activated by calcination in dry air at 600° C. for five hours in a fluidized bed to produce a fluorided, chromium-containing silica-alumina.

Film Blowing

Films were made from the polymer compositions of this invention and other polymers for comparison purposes using one of two blown film processing lines or a cast film line. One blown film processing line used a 1.5 inch diameter Davis-Standard extruder with a L/D of 24:1, having a barrel temperature of 190° C. to 200° C., a screw speed of 115 RPM, and an output of 60 pounds per hour. The David-Standard extruder fed a 4 inch diameter Sano die having a 0.060 inch die gap. Films of typically 0.001–0.0005 inch (1 to 0.5 mil) thickness were blown on a 2.5:1 blow-up ratio and a production rate of 80 ft/min. Frostline heights were usually in the range of 6–12 inches. Cooling was accomplished using a Dual Lip Air Ring using laboratory (ambient) air at about 75–80° F. After cooling, the film passed through a wooden take-up tower and nip roll assembly, with a resultant flattened or layflat width of 15.7 inches. These particular processing conditions were chosen since the film properties so obtained are representative of those obtained from larger, commercial scale film blowing conditions.

The second blown film processing line used an Egan extruder with a 3.5 inch diameter 24:1 L/D Egan smooth barrel without grooves having a 2-stage screw with Dulmage mixing section. The Egan extruder fed a Sano 8-inch diameter die with 60 mil die gap. Thus, a 50 inch bubble was blown with a 2:1 blow-up ratio and 24 inch frostline height. Bubble layflat was 50 inches. Typical melt temperatures ranged from 210° C. to 250° C.

The cast films were made on a Randcastle Microtruder CF [Model RC-0625] which consisted of a table-top ⅝ inch (16 mm) single screw extruder. The extruder was fitted with a 5 inch (127 mm) wide slot die with a die gap of 0.020 inches (0.5 mm). The extruder and die temperatures were maintained at 204° C. (400° F.) and 215° C. (420° F.), respectively, resulting in a melt temperature of 196° C. (385° F.). The screw speed was adjusted to maintain a constant output rate of about 520 g/hr. The melt as it exited the die was quenched using a pair of high velocity air-knives, held 1 inch (25 mm) above and below the melt and at a distance of 4 inches (100 mm) downstream of the die exit. The film, subsequent to crystallization and solidification, was taken up through a pair of primary and secondary rollers onto a film winder. The take-up speed was adjusted to maintain a nominal film thickness of 3 mils (75 microns) for all samples.

Polymer Tests

Bulk density was determined in lbs/ft by weighing a 100 ml graduated cylinder in which polymer fluff had been lightly tapped.

Polymer density was determined in grams per cubic centimeter (g/cc) on a compression molded sample, cooled at about 15° C. per hour, and conditioned for about 40 hours at room temperature in accordance with ASTM D1505-68 and ASTM D1928, procedure C.

Melt Flow Index (MI) in grams of polymer per ten minutes was determined in accordance with ASTM D1238, condition 190/2, at 190° C. with a 2,160 gram weight.

High load melt index (HLMI, g/10 min) was determined in accordance with ASTM D1238, Condition 190/2.16, at 190° C. with a 21,600 gram weight.

Molecular weights and molecular weight distributions were obtained using a Waters 150 CV gel permeation chromatograph (GPC) with trichlorobenzene (TCB) as the solvent, with a flow rate of 1 mL/minute at a temperature of 140° C. BHT (2,6-di-tert-butyl-4-methylphenol) at a concentration of 1.0 g/L was used as a stabilizer in the TCB. An injection volume of 220 microliters was used with a nominal polymer concentration of 0.3 g/l (at room temperature). Dissolution of the sample in stabilized TCB was carried out by heating at 160–170° C. for 20 hours with occasional, gentle agitation. The column was two Waters HT-6E columns (7.8×300 mm). The columns were calibrated with a broad linear polyethylene standard (Phillips Marlex® polyethylene BHB 5003) for which the molecular weight had been determined.

Haze was determined in accordance with ASTMD-1003. A Gardner XL211 hazeguard/hazemeter system was utilized.

Gloss was determined in accordance with ASTMD-2457.

Example 1

The fluorided, titanium-containing silica-alumina (Catalyst B) was tested for polymerization activity in the 2.2 liter autoclave reactor with 1 mL of TEA, but no metallocene. It produced 53 grams of polymer per gram of fluorided, titanium-containing silica-alumina per hour. The polymer had a zero melt index, a zero HLMI, and a viscosity average molecular weight of 2.4 million. Therefore, the fluorided, titanium-containing silica-alumina produced a high molecular weight polymer component that can be utilized to produce the polymer composition of this invention.

The fluorided, titanium-containing silica-alumina then was retested for polymerization activity as conducted previously, except that a metallocene was added to the reactor also to produce a polymer composition. A much improved activity of 4680 grams of polymer per gram of fluorided, titanium-containing silica-alumina per hour was observed. Thus, the polymer composition obtained was a combination of a very small amount (about 1.1%) of an extremely high molecular weight polymer component from the fluorided, titanium-containing silica-alumina and a majority of lower molecular weight polymer produced from the metallocene catalyst. The fluorided, titanium-containing silica-alumina thus contributed a high molecular weight polymer component equal to about 1% of the bimodal polymer composition. The polymer composition had a high load melt index of 3.67 and a melt index of 0.22. These results are shown in Table 1.

TABLE 1

Bench Scale Evaluation of the Fluorided, Titanium-Containing Silica-Alumina (Catalyst B) With and Without Metallocene

| Run # | Run Condition | Catalyst B Charged (g) | Polymer Yield (g) | Run time (min) | Activity (g/g/h) | HLMI (g/10 min) |
|---|---|---|---|---|---|---|
| 100 | With Metallocene | 0.0350 | 178 | 65.2 | 4680 | 3.5 |
| 110 | Without Metallocene | 0.5428 | 30 | 62.1 | 53 | 0 |

* Activity - grams of polymer per gram of fluorided, titanium-containing silica-alumina per hour.

Example 2

Both catalysts A and B then were used in the 23 gallon loop reactor with bis(n-butylcyclopentadienyl) zirconium dichloride to produce linear low density polyethylene (LLDPE). Both catalyst A and B had similar activity. In this back-to-back progression, it is easy to see the effect of the high molecular weight polymer component produced by Catalyst B. These results are shown in Table 2. Notice that although the HLMI/MI ratio did not change;e noticeably, there is a substantial rise in the bulk density of the polymer from about 20 lbs/ft to about 25 lbs/ft. This increase in bulk density allows for an increase in polymer production.

TABLE 2

| Run # | Rxn Temp (° F.) | Melt Index (g/10 min) | HLMI (g/10 min) | HLMI/ MI | Density (g/cc) | Bulk Density (lbs/ft) |
|---|---|---|---|---|---|---|
| Catalyst A (Fluorided Silica-Alumina) contained only 10% NH$_4$HF$_2$, 450° C. | | | | | | |
| 200 | 185 | 4.45 | 73.1 | 16.42 | 0.9192 | 20.2 |
| 210 | 185 | 3.76 | 64.63 | 17.18 | 0.9167 | 19.8 |
| 220 | 185 | 3.94 | 65.04 | 16.51 | 0.9172 | 20.2 |
| 230 | 185 | 3.86 | 61.19 | 15.85 | 0.9179 | 20.2 |
| Catalyst B (Fluorided, Titanium-Containing Silica-Alumina) contained 6% Ti, 10% NH$_4$HF$_2$, 450° C. | | | | | | |
| 240 | 185 | 2.84 | 43.25 | 15.22 | 0.9190 | 24.2 |
| 250 | 185 | 2.76 | 40.09 | 14.52 | 0.9184 | 24.9 |
| 260 | 185 | 2.56 | 43.25 | 16.89 | 0.9178 | 24.9 |
| 270 | 175 | 3.51 | 54.34 | 15.5 | 0.9179 | 23.0 |

Example 3

Both catalyst A and catalyst C were used in the 23 gallon loop reactor described previously with bis(n-butylcyclopentadienyl) zirconium dichloride at 80° C. with 1-hexene as comonomer to make grades of linear low density film polymer. These polymers are shown in Table 3.

GPC analysis of the polymers using a viscometer detector showed that the polymer produced from catalyst C contained high molecular weight polymer component. Careful inspection revealed that the polymer from catalyst C contained about 2.8% of its polymer above a molecular weight of one million, whereas the polymer produced from catalyst A contained almost none.

The polymer from Catalyst A and the inventive polymer composition produced using Catalyst C were successfully blown into 1 mil thick film on the second processing line described previously. The film produced using the inventive polymer composition had improved melt strength. The melt index of film produced using catalyst A was 0.78 g/10 min, 0.90 g/10 min, and 0.94 g/10 min while the film produced using the inventive polymer composition produced from catalyst C had a melt index of 1.16 g/10 min and 2.03 g/10 min.

The optical properties of the film also are shown in Table 3. The high molecular polymer produced by Catalyst C contained in the polymer composition resulted in improved optical properties. The haze of the film using polymer produced from Catalyst A was 9.92%, 15.13%, and 12.7%, while the haze of the film using the inventive polymer composition from Catalyst C was 7.83% and 6.6%. The gloss of the film using the polymer composition produced from Catalyst C also was improved over the film produced from polymer produced from Catalyst A.

TABLE 3

| Run | Catalyst | Melt Index (g/10 min) | Density (g/cc) | Haze (%) | Gloss 60 (%) |
|---|---|---|---|---|---|
| 300 | A | 0.94 | 0.9184 | 9.92 | 98.43 |
| 310 | A | 0.90 | 0.9171 | 15.13 | 79.17 |
| 320 | A | 0.78 | 0.9189 | 12.7 | 87.00 |
| 330 | C | 1.16 | 0.9198 | 7.83 | 101.87 |
| 340 | C | 2.03 | 0.9185 | 6.6 | |

Example 4

Another demonstration of improved properties from the polymer composition can be seem from the following blending study. A metallocene-based LLDPE, commercially available from Phillips Petroleum Company as grade D143, was blended with varying amounts of another low density polyethylene polymer, also sold commercially through Phillips Petroleum Company as D257. D143 was used as the base polymer and had a melt index of 1.3 g/10 min, density of 0.916 g/cc, polydispersity (Mw/Mn) of 2.3, and by GPC determination, contained almost no polymer having a molecular weight above one million. D257 was utilized as the high molecular weight polymer component. D257 is a chromium-based, broad molecular weight distribution, low density polymer containing a high molecular weight polymer component. It had a melt index of 0.2 g/10 min and a density of 0.923 g/cc. By GPC analysis, it was estimated that D257 contained about 10.3% by weight of polymer having a molecular weight greater than one million.

These two polymers were blended together during film blowing on the second processing line described previously, then blown into 1 mil thick film. The smallest increment of D257 added was 20% of the polymer composition, which equates to about 2.1% by weight of the polymer contained in the polymer composition having a molecular weight greater than one million. This amount provided a reduction in the already low haze value. The results of this study are shown in Table 4.

TABLE 4

D143 Blended with D257

| Polymer | Haze (%) | Gloss @ 60 |
|---|---|---|
| 100% D143 | 16.8 | 37 |
| 100% D143 | 11.4 | 50 |
| 80% D143 + 20% D257 | 9.3 | 57 |

Example 5

Another blending study was conducted in which D257 was blended with another metallocene derived base polymer. This base polymer had a melt index of about 1 g/10 min, a density of 0.926 g/cc, and a polydispersity (Mw/Mn) of 2.4. Only 3% of D257 was blended with 97% of the base polymer, so that the polymer composition contained about 0.3% of polymer having a molecular weight greater than one million. It was then converted into 1 mil film using the case film processing line described previously. Even this small quantity of added high molecular weight polymer component yielded a significant improvement in clarity. These data are summarized in Table 5.

TABLE 5

Blended Polymer

| Polymer Type | Density (g/cc) | Haze (%) |
|---|---|---|
| Base Polymer | 0.926 | 30.2 |
| Base Polymer + 3% D257 | 0.926 | 18.9 |

While this invention has been described in detail for the purpose of illustration, it is not intended to be limited thereby but is intended to cover all changes and modifications within the spirit and scope thereof.

Example 6

Another blending study was conducted in which D257 was blended with yet another metallocene derived base polymer. This base polymer had a melt index of about 1 g/10 min, a density of 0.920 g/cc, and a polydispersity (Mw/Mn) of 2.4. Only 5% of D257 was blended with 95% of the base polymer, so that the polymer composition contained about 0.5% of polymer having a molecular weight greater than one million. It was then converted into 1 mil film using the first blow film processing line described, previously. Even this small quantity of added high molecular weight polymer component yielded a significant improvement in optical properties as may be seen from the reduction in haze. These data are summarized in Table 6.

TABLE 6

Blended Polymer

| Polymer Type | Density (g/cc) | Haze (%) |
|---|---|---|
| Base Polymer | 0.920 | 22.6 |
| Base Polymer + 5% D257 | 0.920 | 8.8 |

While this invention has been described in detail for the purpose of illustration, it is not intended to be limited thereby but is intended to cover all changes and modifications within the spirit and scope thereof.

That which is claimed is:

1. A process for producing a polymer composition, said process comprising incorporating a narrow molecular weight distribution base polymer and a high molecular weight polymer component to produce said polymer composition;
    wherein said base polymer is an ethylene polymer having a Mw/Mn less than about 5 and a melt flow index from about 0.2 g/10 min to about 20 g/10 min; and
    wherein said high molecular weight polymer component has a molecular weight distribution such that at least a substantial portion of its molecules have a molecular weight of greater than one million, said high molecular weight polymer component being incorporated is in an amount to give about 0.1% to about 10% by weight, based on the total weight of said polymer composition, of said molecules having a molecular weight greater than one million.

2. A process according to claim 1 wherein said Mw/Mn of said base polymer is less than about 4.0.

3. A process according to claim 2 wherein said melt flow index of said base polymer is in a range from about 0.5 g/10 min to about 10 g/10 min.

4. A process according to claim 3 wherein said base polymer is produced by a catalyst selected from the group consisting of metallocene catalyst, Ziegler catalysts containing magnesium and titanium halides, and chromium catalyst.

5. A process according to claim 4 wherein said Mw/Mn of said base polymer is less than 3.0.

6. A process according to claim 5 wherein said melt flow index of said base polymer is in a range from 0.8 g/10 min to 5.0 g/10 min.

7. A process according to claim 6 wherein said base polymer has a density in a range of about 0.910 g/cc to about 0.940 g/cc.

8. A process according to claim 7 wherein said base polymer has a density in a range of 0.915 g/cc to 0.93 g/cc.

9. A process according to claim 1 wherein said high molecular weight polymer component being incorporated is in an amount to give about 0.5 to about 5% by weight, based on the total weight of said polymer composition, of said molecules having a molecular weight greater than one million.

10. A process according to claim 9 wherein said high molecular weight polymer component is produced from a catalyst selected from the group consisting of Ziegler catalysts based on titanium halides, zirconium halides, zirconium alkyls, chromium oxide catalysts, metallocene catalysts, and mixtures thereof.

11. A process according to claim 10 wherein said high molecular weight polymer component being incorporated is in an amount to give 1% to 3% by weight, based on the total weight of said polymer composition, of said molecules having a molecular weight greater than one million.

12. A process according to claim 11 wherein said high molecular weight polymer component also contains a substantial amount of polymer of molecular weight lower than one million provided said high molecular weight polymer component has a sufficient amount of polymer above one million in molecular weight to contribute the proper amount of high molecular weight polymer component.

13. A process according to claim 1 wherein said incorporating of said high molecular weight polymer component with said base polymer occurs in a polymerization zone by modifying a polymerization catalyst system before or after said polymerization catalyst system is added to said polymerization zone to produce said base polymer and said high molecular weight polymer component.

14. A process according to claim 13 wherein said modifying of said polymerization catalyst system is achieved by adding a second transition metal component to said polymerization catalyst system which then is capable of generating simultaneously said base polymer and said high molecular weight polymer component.

15. A process according to claim 13 wherein said polymerization catalyst system comprises two metallocene components with a first metallocene component producing said base polymer and a second metallocene component producing said high molecular weight polymer component.

16. A process according to claim 14 wherein modifying said polymerization catalyst system occurs while it is in said polymerization zone by adding said second transition metal component which will react with said polymerization catalyst system to produce said high molecular weight polymer component.

17. A process according to claim 16 wherein said polymerization catalyst system comprises a metallocene and wherein said second transition metal component is a titanium or chromium component.

18. A process according to claim 17 wherein said second transition metal component is a fluorided, titanium-containing silica-alumina or a fluorided, chromium-containing silica-alumina.

19. A process according to claim 1 wherein said incorporating of said high molecular weight polymer component and said base polymer occurs by blending said high molecular weight polymer component and said base polymer after said high molecular weight polymer component and base polymer are produced separately.

20. A process for increasing the clarity of blown film from a narrow molecular weight distribution base polymer, said process comprising incorporating with said base polymer a high molecular weight polymer component to produce said polymer composition;
wherein said base polymer is an ethylene polymer having a Mw/Mn less than about 5 and a melt flow index from about 0.2 g/10 min to about 20 g/10 min; and
wherein said high molecular weight polymer component has a molecular weight distribution such that at least a substantial portion of its molecules have a molecular weight of greater than one million, said high molecular weight polymer component being incorporated in an amount to give about 0.1 to about 10% by weight, based on the total weight of said polymer composition, of said molecules having a molecular weight greater than one million.

21. A process according to claim 20 wherein said Mw/Mn of said base polymer is less than about 4.0.

22. A process according to claim 21 wherein said melt flow index of said base polymer is in a range from about 0.5 g/10 min to about 10 g/10 min.

23. A process according to claim 22 wherein said base polymer is produced by a catalyst selected from the group consisting of metallocene catalyst, Ziegler catalysts containing magnesium and titanium halides, and chromium catalyst.

24. A process according to claim 23 wherein said Mw/Mn of said base polymer is less than 3.0.

25. A process according to claim 24 wherein said melt flow index of said base polymer is in a range from 0.8 g/10 min to 5.0 g/10 min.

26. A process according to claim 25 wherein said base polymer has a density in a range of about 0.910 g/cc to about 0.940 g/cc.

27. A process according to claim 26 wherein said base polymer has a density in a range of 0.915 g/cc to 0.93 g/cc.

28. A process according to claim 20 wherein said high molecular weight polymer component being incorporated is in an amount to give about 0.5% to about 5% by weight, based on the total weight of said polymer composition, of said molecules having a molecular weight greater than one million.

29. A process according to claim 28 wherein said high molecular weight polymer component is produced from a catalyst selected from the group consisting of Ziegler catalysts based on titanium halides, zirconium halides, zirconium alkyls, chromium oxide catalysts, metallocene catalysts, and mixtures thereof.

30. A process according to claim 29 wherein said high molecular weight polymer component being incorporated is in an amount to give 1% to 3% by weight, based on the total weight of said polymer composition, of said molecules having a molecular weight greater than one million.

31. A process according to claim 30 wherein said high molecular weight polymer component also contains a substantial amount of polymer of molecular weight lower than one million provided said high molecular weight polymer component has a sufficient amount of polymer above one million in molecular weight to contribute the proper amount of high molecular weight polymer component.

32. A process according to claim 20 wherein said incorporating of said high molecular weight polymer component with said base polymer to increase the clarity of blown film from said base polymer occurs in a polymerization zone by modifying a polymerization catalyst system before or after said polymerization catalyst system is added to said polymerization zone to produce said base polymer and said high molecular weight polymer component.

33. A process according to claim 32 wherein said modifying of said polymerization catalyst system is achieved by adding a second transition metal component to said polymerization catalyst system which then is capable of generating simultaneously said base polymer and said high molecular weight polymer component.

34. A process according to claim 32 wherein polymerization catalyst system comprises two metallocene components with a first metallocene component producing said base polymer and a second metallocene component producing said high molecular weight polymer component.

35. A process according to claim 33 wherein modifying said polymerization catalyst system occurs while it is in said polymerization zone by adding said second transition metal component which will react with said polymerization catalyst system to produce high molecular weight polymer component.

36. A process according to claim 35 wherein said polymerization catalyst system comprises a metallocene and wherein said second transition metal component is a titanium or chromium component.

37. A process according to claim 36 wherein said second transition metal component is a fluorided, titanium-containing silica-alumina or a fluorided, chromium-containing silica-alumina.

38. A process according to claim 20 wherein said incorporating of said high molecular weight polymer component and said base polymer to improve the clarity of blown film of said base polymer occurs by blending said high molecular weight polymer component and said base polymer after said high molecular weight polymer component and base polymer are produced separately.

39. A process according to claim 20 wherein said base polymer and said high molecular weight polymer component are produced by a process comprising contacting ethylene, 1-hexene, bis(n-butylcyclopentadienyl)zirconium dichloride, a fluorided, chromium-containing silica-alumina, and triethylaluminum in a polymerization zone under polymerization conditions.

40. A process for increasing the bulk density of a narrow molecular weight distribution base polymer, said process comprising incorporating with said base polymer a high molecular weight polymer component to produce said polymer composition;

wherein said base polymer is an ethylene polymer having a Mw/Mn less than about 5 and a melt flow index from about 0.2 g/10 min to about 20 g/10 min;

wherein said high molecular weight polymer component has a molecular weight distribution such that at least a substantial portion of its molecules have a molecular weight of greater than one million, said high molecular weight polymer component being incorporated in an amount to give about 0.1 to about 10% by weight, based on the total weight of said polymer composition, of said molecules having a molecular weight greater than one million;

wherein said incorporating of said high molecular weight polymer component and said base polymer occurs in a polymerization zone by modifying a polymerization catalyst system before or after said polymerization catalyst system is added to said polymerization zone.

41. A process according to claim 40 wherein said Mw/Mn of said base polymer is less than about 4.0.

42. A process according to claim 41 wherein said melt flow index of said base polymer is in a range from about 0.5 g/10 min to about 10 g/10 min.

43. A process according to claim 42 wherein said base polymer is produced by a catalyst selected from the group consisting of metallocene catalyst, Ziegler catalysts containing magnesium and titanium halides, and chromium catalyst.

44. A process according to claim 43 wherein said Mw/Mn of said base polymer is less than 3.0.

45. A process according to claim 44 wherein said melt flow index of said base polymer is in a range from 0.8 g/10 min to 5.0 g/10 min.

46. A process according to claim 45 wherein said base polymer has a density in a range of about 0.910 g/cc to about 0.940 g/cc.

47. A process according to claim 46 wherein said base polymer has a density in a range of 0.915 g/cc to 0.93 g/cc.

48. A process according to claim 40 wherein said high molecular weight polymer component being incorporated is in an amount to give about 0.5% to about 5% by weight, based on the total weight of said polymer composition, of said molecules having a molecular weight greater than one million.

49. A process according to claim 48 wherein said high molecular weight polymer component is produced from a catalyst selected from the group consisting of Ziegler catalysts based on titanium halides, zirconium halides, zirconium alkyls, chromium oxide catalysts, metallocene catalysts, and mixtures thereof.

50. A process according to claim 49 wherein said high molecular weight polymer component being incorporated is in an amount to give 1% to 3% by weight, based on the total weight of said polymer composition, of said molecules having a molecular weight greater than one million.

51. A process according to claim 50 wherein said high molecular weight polymer component also contains a substantial amount of polymer of molecular weight lower than one million provided said high molecular weight polymer component has a sufficient amount of polymer above one million in molecular weight to contribute the proper amount of high molecular weight polymer component.

52. A process according to claim 40 wherein said incorporating of said high molecular weight polymer component with said base polymer to increase the bulk density of said base polymer occurs in a polymerization zone by modifying a polymerization catalyst system before or after said polymerization catalyst system is added to said polymerization zone to produce said base polymer and said high molecular weight polymer component.

53. A process according to claim 52 wherein said modifying of said polymerization catalyst system is achieved by adding a second transition metal component to said polymerization catalyst system which then is capable of generating simultaneously said base polymer and said high molecular weight polymer component.

54. A process according to claim 52 wherein polymerization catalyst system comprises two metallocene components with a first metallocene component producing said base polymer and a second metallocene component producing said high molecular weight polymer component.

55. A process according to claim 53 wherein modifying said polymerization catalyst system occurs while it is in said polymerization zone by adding said second transition metal component which will react with said polymerization catalyst system to produce high molecular weight polymer component.

56. A process according to claim 55 wherein said polymerization catalyst system comprises a metallocene and wherein said second transition metal component is a titanium or chromium component.

57. A process according to claim 56 wherein said second transition metal component is a fluorided, titanium-containing silica-alumina or a fluorided, chromium-containing silica-alumina.

58. A process according to claim 40 wherein said base polymer and said high molecular weight polymer component are produced by a process comprising contacting ethylene, 1-hexene, bis(n-butylcyclopentadienyl)zirconium dichloride, a fluorided, titanium-containing silica-alumina, and triethylaluminum in a polymerization zone under polymerization conditions.

59. A polymer composition produced by the process of claim 1.

60. A polymer composition produced by the process of claim 20.

61. A polymer composition produced by the process of claim 40.

62. A polymer composition comprising a narrow molecular weight distribution base polymer and a high molecular weight polymer component;

wherein said base polymer is an ethylene polymer having a Mw/Mn less than about 5 and a melt flow index from about 0.2 g/10 min to about 20 g/10 min;

wherein said high molecular weight polymer component has a molecular weight distribution such that at least a substantial portion of its molecules have a molecular weight of greater than one million, said component being incorporated in an amount to give about 0.1 to about 10% by weight, based on the total weight of said polymer composition, of said molecules having a molecular weight greater than one million.

63. A polymer composition according to claim 62 wherein said Mw/Mn of said base polymer is less than about 4.0.

64. A polymer composition according to claim 63 wherein said melt flow index of said base polymer is in a range from about 0.5 g/10 min to about 10 g/10 min.

65. A polymer composition according to claim 64 wherein said base polymer is produced by a catalyst selected from the group consisting of metallocene catalyst, Ziegler catalysts containing magnesium and titanium halides, and chromium catalyst.

66. A polymer composition according to claim 65 wherein said Mw/Mn of said base polymer is less than 3.0.

67. A polymer composition according to claim 66 wherein said melt flow index of said base polymer is in a range from 0.8 g/10 min to 5.0 g/10 min.

68. A polymer composition according to claim 67 wherein said base polymer has a density in a range of about 0.910 g/cc to about 0.940 g/cc.

69. A polymer composition according to claim 68 wherein said base polymer has a density in a range of 0.915 g/cc to 0.93 g/cc.

70. A polymer composition according to claim 62 wherein said high molecular weight polymer component being incorporated is in an amount to give about 0.5 to about 5% by weight, based on the total weight of said polymer composition, of said molecules having a molecular weight greater than one million.

71. A polymer composition according to claim 70 wherein said high molecular weight polymer component is produced from a catalyst selected from the group consisting of Ziegler catalysts based on titanium halides, zirconium halides, zirconium alkyls, chromium oxide catalysts, chromocene catalysts, metallocene catalysts, and mixtures thereof.

72. A polymer composition according to claim 71 wherein said high molecular weight polymer component being incorporated is in an amount to give 1% to 3% by weight, based on the total weight of said polymer composition, of said molecules having a molecular weight greater than one million.

73. A polymer composition according to claim 71 wherein said high molecular weight polymer component also contains a substantial amount of polymer of molecular weight lower than one million provided said high molecular weight polymer component has a sufficient amount of polymer above one million in molecular weight to contribute the proper amount of high molecular weight polymer component.

* * * * *